UNITED STATES PATENT OFFICE.

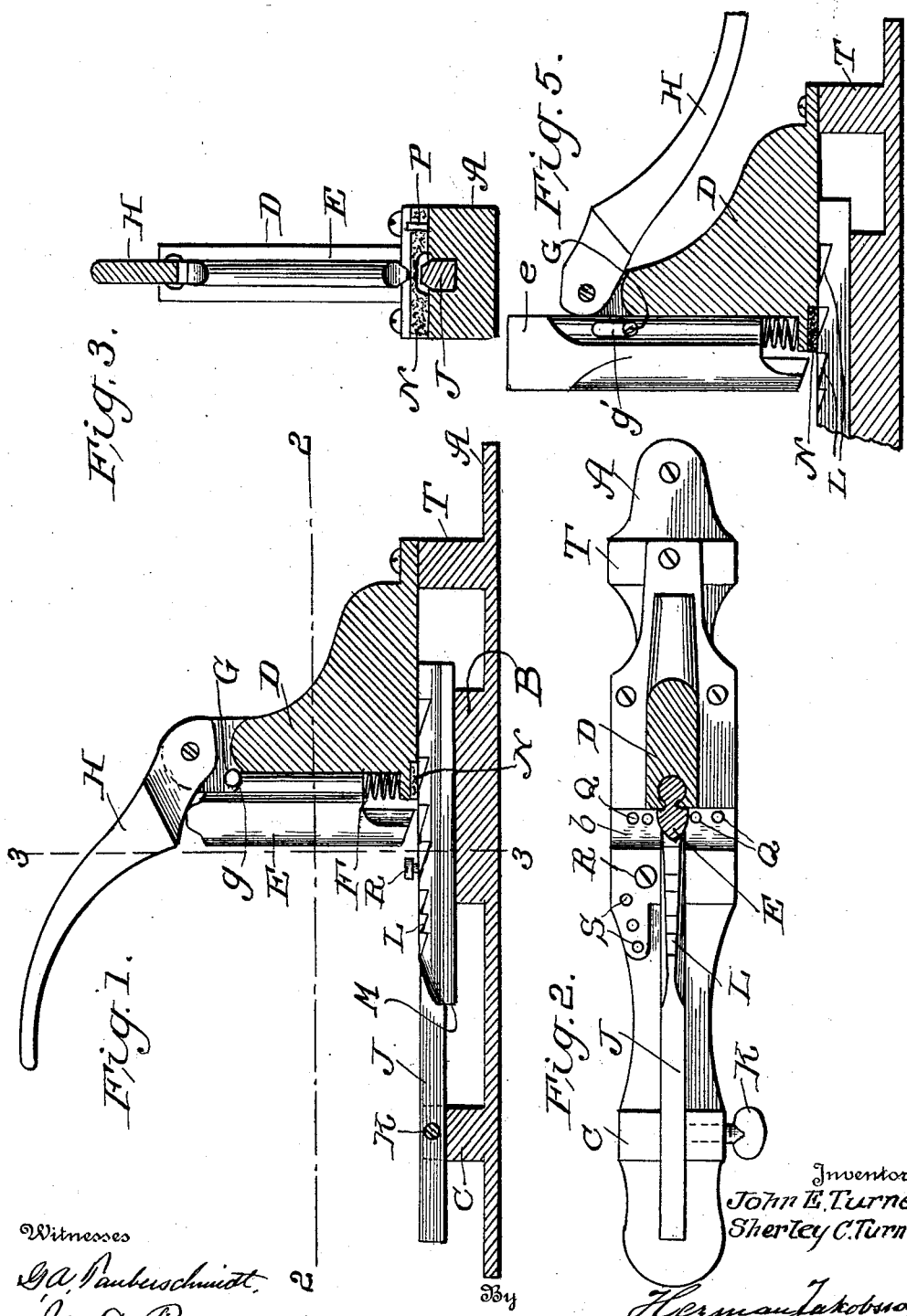

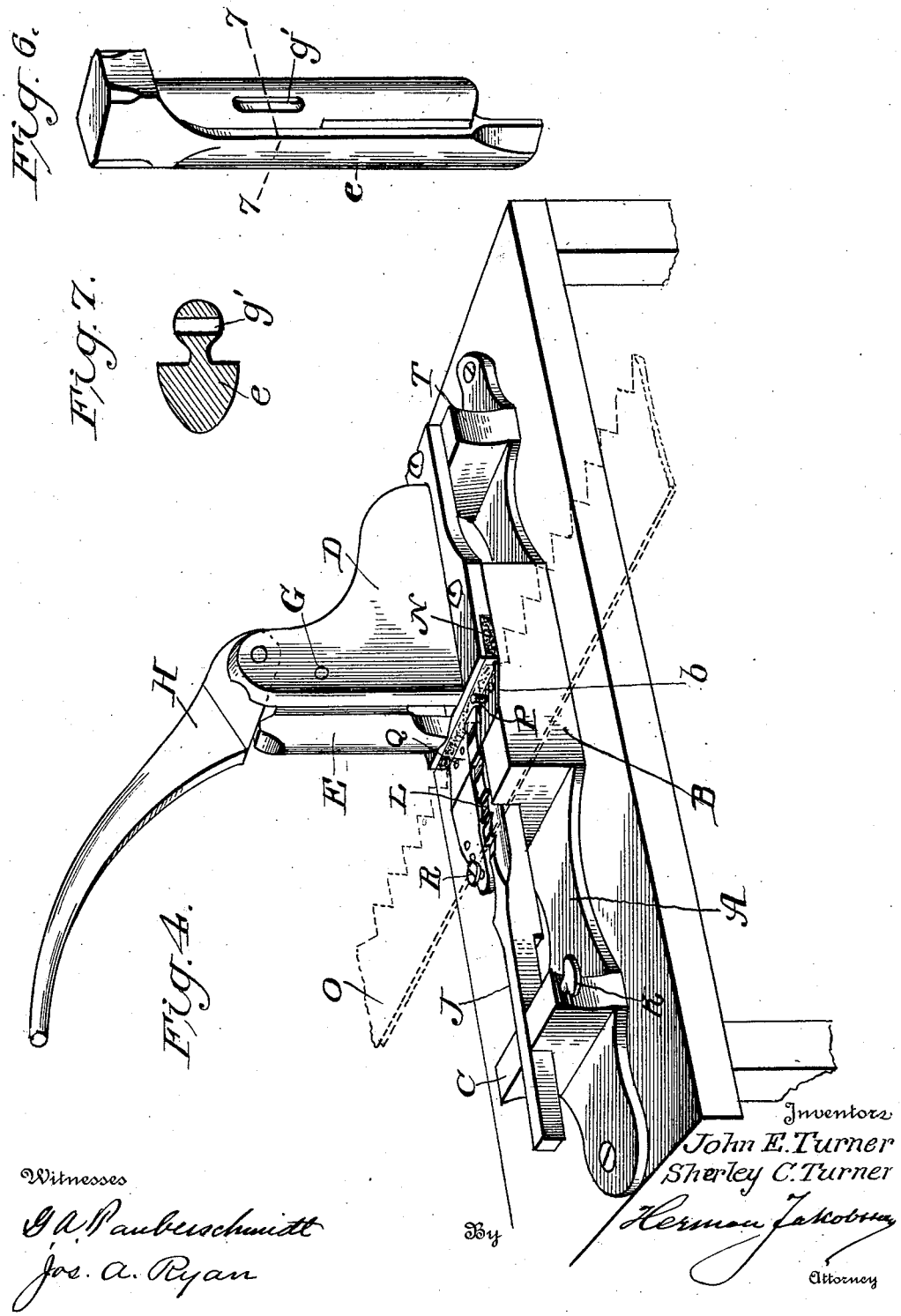

JOHN E. TURNER, OF NORMANTOWN, AND SHERLEY C. TURNER, OF ROSEDALE, WEST VIRGINIA.

SAW-SETTING DEVICE.

1,097,272.  Specification of Letters Patent. Patented May 19, 1914.

Application filed March 9, 1914. Serial No. 823,344.

*To all whom it may concern:*

Be it known that we, JOHN E. TURNER, residing at Normantown, county of Gilmore, and State of West Virginia, and SHERLEY C. TURNER, residing at Rosedale, county of Braxton, in said State, citizens of the United States, have invented certain new and useful Improvements in Saw-Setting Devices, of which the following is a specification.

The present invention relates to a saw-setting device and has for its object to provide an apparatus of simple construction, which may be used for saw blades of any size from the lightest handsaws to heavy wood or timber saws, with teeth of any shape whether fine or coarse. And the adjustment of the apparatus from one kind of blade to another is practically instantaneous and very easily performed.

In the accompanying drawings one embodiment of our invention has been illustrated and Figure 1 shows a longitudinal section of the device; Fig. 2 a top plan view partly in section along line 2—2 of Fig. 1; Fig. 3 a vertical section along line 3—3 of Fig. 1; Fig. 4 a perspective view of the complete apparatus; Fig. 5 a similar view to Fig. 1 showing the central portion only and with a different kind of plunger; Fig. 6 a perspective view of the plunger illustrated in Fig. 5; and Fig. 7 a cross section along line 7—7 of Fig. 6.

The apparatus has a base or foundation A secured in any suitable manner on a stand. A block B is provided at about the middle of the base A, and near its forward end, a smaller block C is situated. The block B forms a seat for the saw blade, which is laid down flat thereon, and the block is provided with a depression $b$ preferably beveled to accommodate the set teeth. The central block supports a standard D, held down by heavy screws on the base. This standard has a vertical guide in which the plunger E is mounted so as to be able to reciprocate freely. It rests on a compression spring F, strong enough to raise the lower end of the plunger sufficiently high above the upper surface of the block B to permit a saw blade of any thickness to pass underneath. To limit the upward motion of the plunger E a stop pin G is fixed in the standard to engage a shoulder $g$ on the plunger E. The lower end of the plunger is beveled to conform with the desired set of the teeth of the saw. This bevel may be made in one direction only, that is transversely to the saw blade which corresponds with the longitudinal direction of the apparatus.

A sliding die-bar J is carried in a guide way provided in the two blocks B and C in the longitudinal direction of the apparatus, so that the bar will pass directly under the beveled end of the plunger E. The depth of the guide is identical with the thickness of the sliding bar J, so that the latter always lies flush with the upper surface of the blocks B and C. Across the bar, on its upper side are made a number of recesses or cuts L of various widths and depths to suit the set of the teeth on different blades and conforming with the bevel of the end of the plunger E. To prevent displacement of the bar J after its adjustment for a particular saw blade, a set screw K is provided in the block C. When properly adjusted, the perpendicular face of one of the cross cuts L should coincide with or be slightly beyond the inner vertical surface of the plunger E.

A strip N of fairly soft material, such as leather, fiber, wood, rubber or brass, is let into the standard D. The purpose of this is to provide a soft backing for the saw teeth, in order not to spoil their sharpness.

A lever H is hinged at the upper end of the standard D, in such a manner that a downward pressure on the lever will push the plunger E against the blade O, compressing spring F and at the same time bending a tooth downward into the cut L, which at the time registers with the plunger. As soon as the lever is released, the plunger will again be raised by the spring F.

In some cases particularly when very thick saws are to be set, it might be preferable to drive the plunger downward with a hammer. Then we provide a plunger $e$ with a broader top and having a slot $g'$ to engage pin G, see Figs. 5, 6 and 7, which however in all other respects is similar to the one previously described.

In order to facilitate the work and avoid loss of time in shifting the blade and positioning, we provide a position plug P and a number of sockets Q therefor on both sides of the plunger E in the block B. The sockets are at different distances transversely from the center line of the bar to suit different pitch of teeth. When putting a blade O in position, it is laid flat on the block B, pushed with the points of the teeth against the strip N and with one side of a tooth resting against the plug P. This insures accuracy in the work.

A clamping arrangement, such as the screw R and a number of holes S for it, might in some cases be found advantageous in order to hold the blade well down on the block. The holes S are tapped at different distances from the straight edge of the strip so as to accommodate blades of different width.

To limit the total displacement of the bar J, a shoulder M is provided on its underside for abutting against the block C; and a stop T at the opposite bar end for the inner end to abut against. This stop may also form a support for the standard D.

We claim:

1. A saw setting device having a base and a standard, a horizontally adjustable die-bar guided in said base and a vertically reciprocable plunger in said standard; said plunger being beveled at its lower end corresponding to the desired set of the saw tooth, and said die-bar being provided with a plurality of recesses of varying widths and depth but each inclined to correspond with the bevel on said plunger.

2. A saw setting device having a base and a standard, a horizontally adjustable die-bar guided in said base, a lever pivoted to said standard and a vertically reciprocable plunger in said standard beneath the lever and engaging therewith; said plunger being beveled at its lower end corresponding to the desired set of the saw tooth, said die-bar being provided with a plurality of recesses of varying widths and depths but each inclined to correspond with the bevel on said plunger.

3. A saw setting device having a base and a standard, a horizontally adjustable die-bar guided in said base, a lever pivoted to said standard and a vertically reciprocable plunger in said standard beneath the lever; said plunger being beveled at its lower end corresponding to the desired set of the saw tooth, and said die-bar being provided with a plurality of recesses of varying widths and depths but each inclined to correspond with the bevel on said plunger; and clamping means for said die-bar to retain it in its adjusted position.

In testimony whereof we affix our signatures in presence of two witnesses.

JOHN E. TURNER.
SHERLEY C. TURNER.

Witnesses to John E. Turner:
H. M. TURNER,
BEN. F. MILLER.

Witnesses to Sherley C. Turner:
HERMAN JAKOBSSON,
EDWIN S. CLARKSON.

Copies of this patent may be obtained for five cents each, by addressing the "Commissioner of Patents, Washington, D. C."